United States Patent Office.

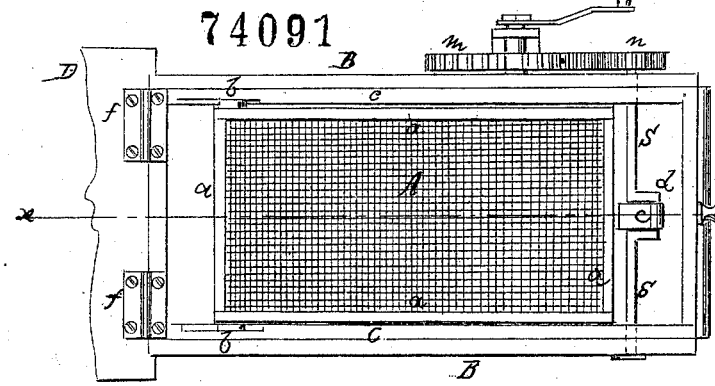
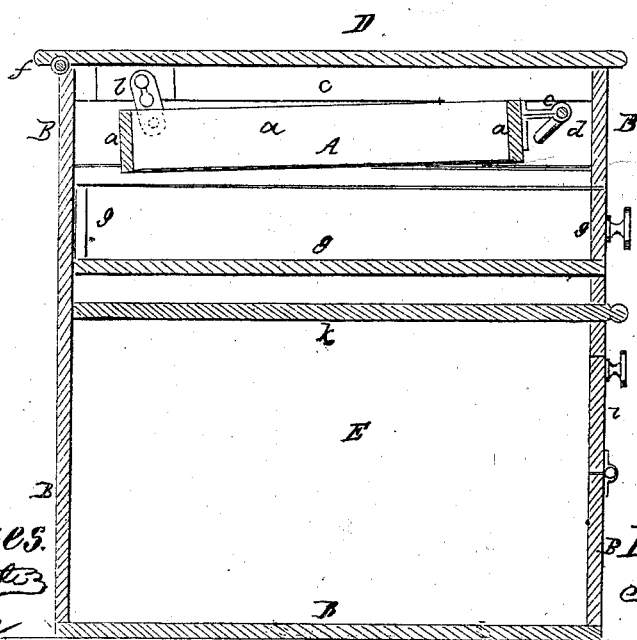

F. A. HOYT, OF HANOVER, WISCONSIN.

Letters Patent No. 74,091, dated February 4, 1868.

---

IMPROVED FLOUR-SAFE AND SIFTER.

---

The Schedule referred to in these Letters Patent and making part of the same.

---

TO ALL WHOM IT MAY CONCERN:

Be it known that I, F. A. HOYT, of Hanover, in the county of Rock, and State of Wisconsin, have invented a new and improved Flour-Safe and Sifter; and I do hereby declare that the following is a full, clear, and exact description thereof, which will enable those skilled in the art to make and use the same, reference being had to the accompanying drawings, forming part of this specification, in which—

Figure 1 is a plan view of my improved safe and sifter.

Figure 2 is a central section, through the line $x\,x'$, fig. 1.

Similar letters of reference indicate corresponding parts.

This invention relates to an article of household use, and consists of a sifter operated by a crank and gearing, the said sifter located over a drawer covering the flour-receptacle beneath, as will be more fully set forth in the following.

A is the wire sieve, $a$ the wooden sides to which the sieve is attached, and the sifter thus formed is suspended within the upper part of the general box B, which is covered by a lid, and encloses the whole of the parts. This lid is hinged at $f$, and is thrown back to allow the charging of the sifter with flour, and, when closed up on the box B, forms a kneading-table for bread-making, as will be again alluded to. The sifter is suspended within the box by two plates, $b\,b$, which are pivoted to the sifter at their lower ends, and swing by slotted eyes upon pins projecting from the batten-strip $c$ nailed to the inner side of the box B. The other end of the sifter is hung by a projecting plate, $e$, to the crank $d$ of a shaft, $s$, as shown. This shaft has bearings in the box, and on its projecting end is keyed a pinion, $n$, which engages with and is revolved by a toothed wheel, $m$, which latter is provided with a crank-handle, $h$, for turning the same and actuating the sifter. The wheel $m$ has a metallic bearing bolted or otherwise attached to the exterior of the box, as shown at fig. 1.

By the revolution of the crank, a reciprocating and undulating motion is imparted to the sifter, which is peculiarly adapted to the operation of sifting flour.

The drawer for receiving the sifted flour is shown at $g$. This drawer can be wholly or partially withdrawn laterally from the box, as its knob indicates, and is for the purpose of mixing the dough as well as for catching the sifted flour. A kneading-board, $k$, fits in suitable slots in the box B, beneath the drawer, as shown, and can be withdrawn, as its projecting bead indicates. When used for kneading the dough it is placed upon the lid D, when the latter is closed, as before mentioned. The remaining space, E, is for use as a flour-safe or bin, and the flour contained therein is accessible through the door $i$.

When a quantity, as a barrel of flour, is to be placed therein, the board $k$ and drawer $g$ are withdrawn, the lid lifted, and the sifter, by disengaging the plates $b$ from their pins on the strip $c$, is turned up vertically on the crank $d$, thus permitting the speedy discharge of the flour into the safe. By closing the lid of the box, when the operation of sifting is being performed, the flour-dust is prevented from flying about.

Thus I have combined, in a compact and simple manner, several articles of household economy, all in one article of furniture, which can be grained or painted to present a pleasing exterior, which would enable it to be used in other rooms than the kitchen or pantry, or in those dwellings not sufficiently spacious to afford separate room for all the culinary operations.

I am aware that sifters have been agitated by machinery within boxes, (see patent granted to H. C. Smith, January 8, 1867, No. 61,026,) and I do not claim such broadly; but

What I claim as new, and desire to secure by Letters Patent, is—

The flour-sifter and safe, constructed as described, and consisting of the box B, having door $i$, moulding-board $k$, drawer $g$, sifter A $a$, crank-shaft $d$ S, metallic slotted straps $b$, side pieces $c$, wheels $m\,n$, handle $h$, and connection $e$, all arranged and operating as set forth.

F. A. HOYT.

Witnesses:
  J. G. HUGGINS,
  E. D. HOLMS.